United States Patent
Wang et al.

(10) Patent No.: US 7,390,530 B2
(45) Date of Patent: Jun. 24, 2008

(54) STRUCTURE AND PROCESS FOR COMPOSITE FREE LAYER IN CPP GMR DEVICE

(75) Inventors: Hui-Chuan Wang, Pleasanton, CA (US); Min Li, Dublin, CA (US); Tong Zhao, Milpitas, CA (US); Kunliang Zhang, Santa Clara, CA (US); Chyu-Jiuh Torng, Pleasanton, CA (US)

(73) Assignee: Headway Technologies, Inc., Milpitas, CA (US)

( * ) Notice: Subject to any disclaimer, the term of this patent is extended or adjusted under 35 U.S.C. 154(b) by 709 days.

(21) Appl. No.: 10/999,826

(22) Filed: Nov. 30, 2004

(65) Prior Publication Data
US 2006/0114621 A1 Jun. 1, 2006

(51) Int. Cl.
*B05D 5/12* (2006.01)
(52) U.S. Cl. .................... 427/127; 427/131; 360/324.12
(58) Field of Classification Search .................. 427/127, 427/131; 360/324.12
See application file for complete search history.

(56) References Cited

U.S. PATENT DOCUMENTS

| | | | |
|---|---|---|---|
| 6,313,973 B1 * | 11/2001 | Fuke et al. ............... | 360/324.1 |
| 6,436,526 B1 | 8/2002 | Odagawa et al. ............ | 428/332 |
| 6,567,246 B1 * | 5/2003 | Sakakima et al. ...... | 360/324.11 |
| 6,661,626 B2 | 12/2003 | Gill ......................... | 360/324.2 |
| 6,778,427 B2 | 8/2004 | Odagawa et al. ............. | 365/158 |
| 6,882,509 B2 * | 4/2005 | Chang et al. ............. | 360/324.1 |
| 6,893,741 B2 * | 5/2005 | Doerner et al. .............. | 428/670 |
| 7,266,012 B2 * | 9/2007 | Saito et al. .................. | 365/158 |
| 2004/0091743 A1 * | 5/2004 | Kula et al. .................. | 428/692 |

OTHER PUBLICATIONS

Co-pending U.S. Appl. No. 10/854,651, filed May 26, 2004, assigned to the same assignee, "Improved Free Layer for CPP GMR Having Iron Rich NiFe."

* cited by examiner

*Primary Examiner*—Alain L Bashore
(74) *Attorney, Agent, or Firm*—Saile Ackerman LLC; Stephen B. Ackerman

(57) ABSTRACT

The conventional free layer in a CPP GMR read head has been replaced by a tri-layer laminate comprising Co rich CoFe, moderately Fe rich NiFe, and heavily Fe rich NiFe. The result is an improved device that has a higher MR ratio than prior art devices, while still maintaining free layer softness and acceptable magnetostriction. A process for manufacturing the device is also described.

10 Claims, 1 Drawing Sheet

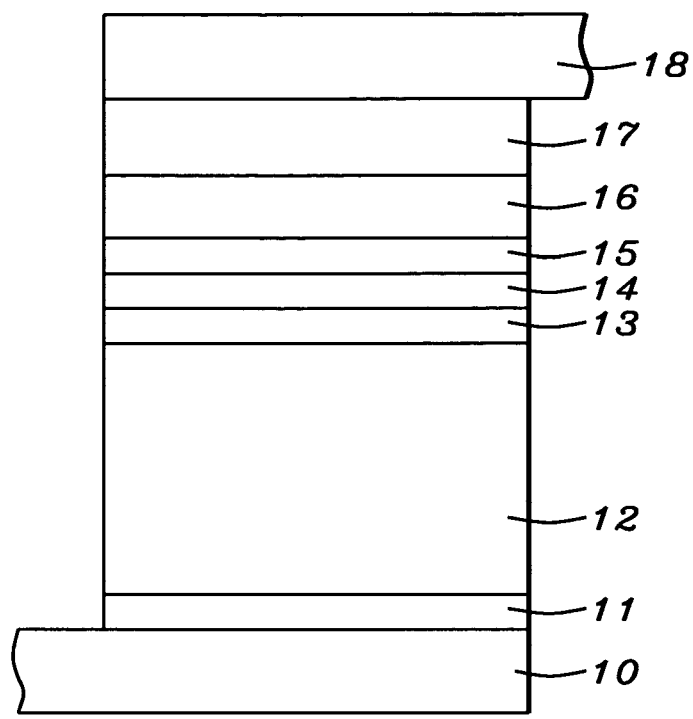
FIG. 1 – Prior Art
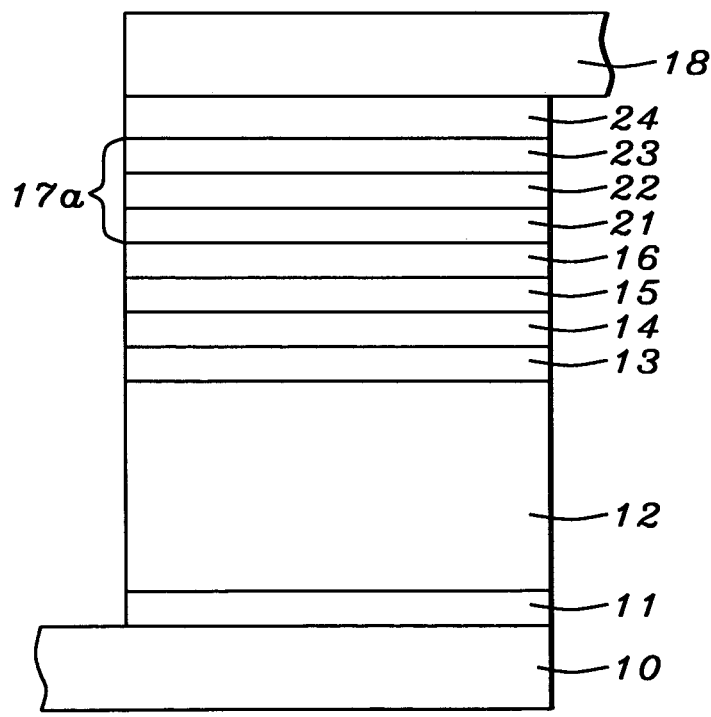
FIG. 2

STRUCTURE AND PROCESS FOR COMPOSITE FREE LAYER IN CPP GMR DEVICE

FIELD OF THE INVENTION

The invention relates to the general field of CPP GMR read heads with particular reference to the free layer sub-structure.

BACKGROUND OF THE INVENTION

The principle governing the operation of most magnetic read heads is the change of resistivity of certain materials in the presence of a magnetic field (magneto-resistance or MR). Magneto-resistance can be significantly increased by means of a structure known as a spin valve where the resistance increase (known as Giant Magneto-Resistance or GMR) derives from the fact that electrons in a magnetized solid are subject to significantly less scattering by the lattice when their own magnetization vectors (due to spin) are parallel (as opposed to anti-parallel) to the direction of magnetization of their environment.

The key elements of a spin valve are illustrated in FIG. 1. They are seed layer 11 (lying on lower conductive lead 10) on which is antiferromagnetic layer 12 whose purpose is to act as a pinning agent for a magnetically pinned layer. The latter is a synthetic antiferromagnet formed by sandwiching antiferromagnetic coupling layer 14 between two antiparallel ferromagnetic layers 13 (AP2) and 15 (AP1).

Next is a non-magnetic spacer layer 16 on which is low coercivity (free) ferromagnetic layer 17. A contacting layer such as lead 18 lies atop free layer 17. Not shown, but generally present, is a capping layer between 17 and 18. When free layer 17 is exposed to an external magnetic field, the direction of its magnetization is free to rotate according to the direction of the external field. After the external field is removed, the magnetization of the free layer will stay at a direction, which is dictated by the minimum energy state, determined by the crystalline and shape anisotropy, current field, coupling field and demagnetization field.

If the direction of the pinned field is parallel to the free layer, electrons passing between the free and pinned layers suffer less scattering. Thus, the resistance in this state is lower. If, however, the magnetization of the pinned layer is anti-parallel to that of the free layer, electrons moving from one layer into the other will suffer more scattering so the resistance of the structure will increase. The change in resistance of a spin valve is typically 8-20%.

Earlier GMR devices were designed so as to measure the resistance of the free layer for current flowing parallel to its two surfaces. However, as the quest for ever greater densities has progressed, devices that measure current flowing perpendicular to the plane (CPP), as exemplified in FIG. 1, have also emerged. CPP GMR heads are considered to be promising candidates for the over 100 Gb/in$^2$ recording density domain (see references 1-3 below).

A related effect to the GMR phenomenon described above is tunneling magnetic resistance (TMR) in which the layer that separates the free and pinned layers is a non-magnetic insulator, such as alumina or silica. Its thickness needs to be such that it will transmit a significant tunneling current.

An MTJ (magnetic tunnel junction) is readily visualized by substituting a very thin dielectric layer for spacer layer 16 described above for the GMR device. The principle governing the operation of the MTJ in magnetic read sensors is the change of resistivity of the tunnel junction between two ferromagnetic layers when it is subjected to a bit field from magnetic media. When the magnetizations of the pinned and free layers are in opposite directions, the tunneling resistance increases due to a reduction in the tunneling probability. The change of resistance is typically 40%, which is much larger than for GMR devices.

If CoFe/FeNi (Fe rich NiFe) is used as the free layer in both TMR and CPP sensors they will have a 20 to 30% GMR ratio gain compared to the typical CoFe/NiFe (Ni rich NiFe such as permalloy) free layer. However there is some concern regarding the free layer magnetic softness because CoFe/FeNi deposited on top of alumina or copper will not be as soft as CoFe/NiFe. The invention discloses how the improved ratio can be achieved without an associated decrease in the magnetic softness of the free layer as well as retaining a low positive magnetostriction.

A routine search of the prior art was performed with the following references of interest being found:

U.S. Pat. Nos. 6,436,526 and 6,778,427 (Odagawa et at) disclose a NiCoFe alloy for the free layer. A Ni rich film is preferred because the resistance of the Ni-rich film is much higher than that of a Fe-rich film. U.S. Pat. No. 6,661,626 (Gill) shows a free layer comprising FeO, CoFe, and NiFe.

Additionally, reference is made to HT04-015 (application Ser. No. 10,854,651 filed May 26, 2004) which deals with a similar problem towards which the present invention takes a different approach.

SUMMARY OF THE INVENTION

It has been an object of at least one embodiment of the present invention to provide a CPP GMR magnetic read head having an improved MR ratio as well as a free layer that is magnetically soft.

Another object of at least one embodiment of the present invention has been to provide a process for manufacturing said read heads.

Still another object of at least one embodiment of the present invention has been that said process be compatible with existing processes for the manufacture of GMR devices.

These objects have been achieved by replacing the conventional free layer by a tri-layer laminate comprising Co rich CoFe, moderately Fe rich NiFe, and heavily Fe rich NiFe. The result is an improved CPP GMR device that has a higher CPP GMR ratio than prior art devices, while still maintaining free layer softness and acceptable magnetostriction. A process for manufacturing the device is also described.

BRIEF DESCRIPTION OF THE DRAWINGS

FIG. 1 shows a GMR/TMR stack of the prior art which has a conventional free layer.

FIG. 2 shows a GMR or TMR stack having a modified free layer according to the teachings of the present invention.

DESCRIPTION OF THE PREFERRED EMBODIMENTS

In a CPP spin valve structure having a free layer such as $Fe_{50}Co$, higher spin polarization ferromagnetic material can improve CPP GMR significantly. It is also known that Fe rich NiFe has higher spin polarization. The present invention shows how this may be applied to the NiFe component of the free layer to improve the CPP GMR.

Instead of using single composition NiFe layer both Fe rich (FeNi$y$) and Ni rich (Ni$z$Fe) layers are combined as part of the free layer of a TMR or CPP sensor. By adjusting FeNi and NiFe thickness and composition it becomes possible to improve the magnetic softness of the free layer and still maintain the higher MR ratio.

Because of the magnetostriction consideration, FeNi-(30-34 at %) and 80-83 at %-NiFe were selected as the most suitable candidates.

Referring now to FIG. 2, we provide a description of the process of the present invention. In the course of this description, the structure of the present invention will also become apparent.

The process begins with the formation of lower lead 10 onto which is deposited seed layer 11 followed by pinning layer 12. Layer 12 comprises a suitable antiferromagnetic material such as IrMn and it is deposited to a thickness between 45 and 80 Angstroms. Layer 13 (AP2), the first of the two antiparallel layers that will form the synthetic AFM pinned layer, is then deposited onto layer 12. This is followed by layer of AFM coupling material 14 and then AP1 layer is deposited thereon.

Next, non-magnetic spacer layer 16 is deposited on AP1 layer 15. For the TMR design, layer 16 would be a dielectric layer of a material such as alumina between about 5 and 10 Angstroms thick.

Now follows a key feature of the invention by which the free layer 17a is made up of three sub-layers 21-23:

Layer 21, which is deposited onto layer 16, is a layer of $Ni_xFe_y$, where x is between about 75 and 90, with 82.5 being preferred and y is between about 10 and 25, with 17.5 being preferred. It is between about 5 and 100 Angstroms thick with about 20 Angstroms being preferred. Layer 22, which is deposited onto layer 21, is a layer of $Ni_wFe_z$, where w is between about 28 and 40, with 34 being preferred, and z is between about 60 and 72, with 66 being preferred. It is between about 5 and 100 Angstroms thick with about 10 Angstroms being preferred.

Note that it is also possible to reverse the order in which layers 21 and 22 are deposited.

The third sub-layer making up the free layer is layer 23. This is a layer of $Co_xFe_y$, where x is between about 70 and 100, with 90 being preferred, and y is up to 30 with 10 being preferred. It is between about 5 and 100 Angstroms thick with about 10 Angstroms being preferred.

The process concludes with the deposition of capping layer 24 followed by upper lead layer 18, the completed structure being now ready to serve as a CPP GMR/TMR read head having a MR ratio of at least 7%.

Conformatory Results

To confirm the effectiveness of the invention, a number of structures were formed and then evaluated as CPP GMR readers:

All structures comprised Seed/Pin/Cu/Free/Cu/Cap (with full CPP Stack being subjected to a final anneal). The free layers were then varied as shown in TABLE I:

TABLE I

| No. | Free | Hce | Hch | Hce/Hch | λ |
|---|---|---|---|---|---|
| 1 | 12 Å 90 at %-CoFe/35 Å 82.5 at %-NiFe | 6.09 | 0.71 | 8.62 | 2.76E−07 |
| 2 | 12 Å 90 at %-CoFe/35 Å 34 at %-NiFe | 15.02 | 0.82 | 18.32 | 2.00E−06 |
| 3 | 10 Å 90 at %-CoFe/15 Å 34 at %-NiFe/25 Å 82.5 at %-NiFe | 6.02 | 0.60 | 10.03 | 2.08E−06 |
| 4 | 10 Å 90 at %-CoFe/10 Å 34 at %-NiFe/28 Å 82.5 at %-NiFe | 5.65 | 0.90 | 6.28 | 1.21E−06 |
| 5 | 10 Å 90 at %-CoFe/25 Å 82.5 at %-NiFe/15 Å 34 at %-NiFe | 5.67 | 0.40 | 14.18 | 2.08E−06 |
| 6 | 10 Å 90 at %-CoFe/20 Å 82.5 at %-NiFe/25 Å 34 at %-NiFe | 6.19 | 0.42 | 14.74 | 2.02E−06 |

CPP Free Layer Magnetic Properties Measured by B-H Looper Hce is Free Layer Easy Axis Coercivity; Hch is Free Layer Hard Axis Coercivity; λ is the Magnetostriction Constant TABLE I is experimental data from a CPP free layer study. Sample #1 is our typical CPP free layer. Sample #2 gives a much higher MR ratio due to the Fe rich NiFe free layer. However the Hce and Hch of sample #2 is more than double compared to sample #1. The results for samples #3 to #6 clearly show that, by adjusting free layer CoFex, FeNiy and NizFe thickness and composition, Hce and Hch can be improved several times compared to sample #2. This will be true whether or not we deposit FeNiy or NizFe first. Magnetostriction is also adjustable into the desirable range (from 0 to −2E-6) by free layer thickness and composition. As already noted, this general concept could also be applied to the design of TMR sensor free layers. Also as previously noted, higher CPP GMR ratio are associated with this free layer design.

What is claimed is:

1. A process to manufacture a CPP GMR read head, having a free layer, comprising:

depositing, in unbroken succession on a lower lead layer, a seed layer and a pinning layer;

on said pinning layer, depositing a pinned layer;

depositing a non magnetic spacer layer on said pinned layer;

on said non magnetic spacer layer, depositing a layer of $Ni_xFe_y$, where x is between 75 and 90 and y is between 10 and 25;

on said $Ni_xFe_y$ layer, depositing a layer of $Ni_wFe_z$, where w is between 28 and 40 and z is between 60 and 72;

on said $Ni_wFe_z$ layer, depositing a layer of $Co_xFe_y$, where x is between 70 and 100 and y is between 0 and 30, said two NiFe layers and said CoFe layer together constituting the free layer; and on said free layer, depositing a capping layer and then an upper lead layer, thereby forming said CPP GMR read head.

2. The process described in claim 1 wherein said $Ni_xFe_y$ layer is deposited to a thickness between about 5 and 100 Angstroms.

3. The process described in claim 1 wherein said $Ni_wFe_z$ layer is deposited to a thickness between about 5 and 100 Angstroms.

4. The process described in claim 1 wherein said $Co_xFe_y$ layer is deposited to a thickness between about 5 and 100 Angstroms.

5. The process described in claim 1 wherein said pinned layer is a synthetic antiferromagnet that comprises oppositely magnetized ferromagnetic layers separated by an antiferromagnetic coupling layer.

6. A process to manufacture a CPP GMR read head, having a free layer, comprising:

depositing, in unbroken succession on a lower lead layer, a seed layer and a pinning layer;

on said pinning layer, depositing a pinned layer;

depositing a non magnetic spacer layer on said pinned layer;

on said non magnetic spacer layer, depositing a layer of $Ni_xFe_y$, where x is between 28 and 40 and y is between 60 and 72;

on said $Ni_xFe_y$ layer, depositing a layer of $Ni_wFe_z$, where w is between 75 and 90 and z is between 10 and 25;

on said $Ni_wFe_z$ layer, depositing a layer of $Co_xFe_y$, where x is between 70 and 100 and y is between 0 and 30, said two NiFe layers and said CoFe layer together constituting the free layer; and on said free layer, depositing a capping layer and then an upper lead layer, thereby forming said CPP GMR read head.

7. The process described in claim 6 wherein said $Ni_xFe_y$ layer is deposited to a thickness between about 5 and 100 Angstroms.

8. The process described in claim 6 wherein said $Ni_wFe_z$ layer is deposited to a thickness between about 5 and 100 Angstroms.

9. The process described in claim 6 wherein said $Co_xFe_y$ layer is deposited to a thickness between about 5 and 100 Angstroms.

10. The process described in claim 6 wherein said pinned layer is a synthetic antiferromagnet that comprises oppositely magnetized ferromagnetic layers separated by an antiferromagnetic coupling layer.

* * * * *